United States Patent [19]

Heugel et al.

[11] Patent Number: 5,495,570
[45] Date of Patent: Feb. 27, 1996

[54] MIRRORED MEMORY MULTI-PROCESSOR SYSTEM

[75] Inventors: Randall W. Heugel, McKinney; Richard Mussett, Plano, both of Tex.

[73] Assignee: Tandem Computers Incorporated, Cupertino, Calif.

[21] Appl. No.: 329,326

[22] Filed: Oct. 26, 1994

Related U.S. Application Data

[63] Continuation of Ser. No. 732,040, Jul. 18, 1991, abandoned.

[51] Int. Cl.[6] .................................................. G06F 11/00
[52] U.S. Cl. .............................. 395/182.09; 395/182.04
[58] Field of Search .............................. 395/575, 182.09, 395/182.08, 182.03, 182.04, 182.05; 371/21.1, 21.2, 10.1, 9.1, 15.1

[56] References Cited

U.S. PATENT DOCUMENTS

| | | | |
|---|---|---|---|
| 3,864,670 | 4/1975 | Inoue et al. | |
| 4,817,091 | 3/1989 | Katzman et al. | 371/9 |
| 4,907,231 | 3/1990 | Watanube et al. | 371/24 |
| 4,933,838 | 12/1990 | Elrod . | |
| 4,975,838 | 12/1990 | Mizuro et al. | 395/575 |
| 5,140,593 | 8/1992 | Hayashi | 371/9.1 |
| 5,146,458 | 9/1992 | Ono | 371/212 |
| 5,157,663 | 10/1992 | Major et al. | 371/9.1 |
| 5,166,936 | 11/1992 | Ewert et al. | 371/216 |
| 5,185,884 | 2/1993 | Martin et al. | 345/575 |
| 5,204,952 | 4/1993 | Ayers et al. | 395/550 |
| 5,237,670 | 8/1993 | Wakerly | 398/425 |

FOREIGN PATENT DOCUMENTS

| | | | |
|---|---|---|---|
| 0116344 | 8/1984 | European Pat. Off. | G06F 11/00 |
| 2294723 | 9/1989 | Japan | G06F 3/06 |
| 1200155 | 7/1970 | United Kingdom | H04M 3/22 |

*Primary Examiner*—Robert W. Beausoliel, Jr.
*Assistant Examiner*—Joseph E. Palys
*Attorney, Agent, or Firm*—Graham & James

[57] ABSTRACT

A multi-processor system having mirrored memory units accessible by either processor. The term "mirrored memory" in the context of the present invention describes the ability of each of the processors to directly READ and WRITE the contents of its own local random access memory (RAM) unit and in the local RAM unit of the other, remote processor. The mirrored memory of the present invention comprises two units of triple-ported RAM, each unit interconnected by a pair of interprocessor busses to the corresponding triple-ported RAM of the remote processor. "Triple-porting" describes the three input/output ports available for accessing a RAM unit. An internal port is used by a processor to access its local RAM, while the other two ports are provided so that the same RAM can be accessed by the remote processor through the paired interprocessor busses. Each processor may READ or WRITE its own local RAM, the remote processor's RAM, or both RAM's during a single operation. The present mirrored memory design facilitates concurrent and independent execution of both processors of a pair. Concurrent execution of both processors during mirrored RAM accesses is possible because the interprocessor busses are configurable as virtual dedicated ports (one for each processor). A method is also provided for equalizing the mirrored memory units of paired processors.

17 Claims, 2 Drawing Sheets

MIRRORED MEMORY MULTI-PROCESSOR SYSTEM

This is a continuation of application Ser. No. 07/732,040 filed on Jul. 18, 1991, abandoned.

BACKGROUND OF THE INVENTION

1. Field of the Invention

This invention relates to computer systems, and more particularly to a multiprocessor system having a mirrored-memory architecture.

2. Description of Related Art

Multi-processor systems in the past have been designed to share data in a common memory unit. Other multiprocessor systems have been designed to share data in several common memory units. However, such systems do not generally provide multiple memory units for purposes of fault tolerance if one memory unit fails. That is, the data in the multiple memory units is generally not redundant.

In some environments, such as real-time transaction processing, it is important to provide redundant elements throughout a computer system in order to prevent the failure of a single element from halting processing. A common technique for providing such redundancy is "mirroring", which is the provision of identical elements operating in parallel on the same data and command streams. Another method of providing such redundancy is the provision of error correction and detection circuitry in conjunction with using extra bits of error correction code information. This technique is commonly used in memory units, where the cost of providing duplicate memory units usually exceeds the cost of providing ECC bits and error correction and detection circuitry. However, in some environments, such redundancy does not provide adequate protection against massive failure of the memory unit itself.

In such circumstances, a need exists to provide redundant memory functionality through mirrored pairs of memory units. Whenever data is written to memory, both mirrored memory units receive and store the data. Thus, if one memory unit completely fails, the other memory unit is available to provide continuous processing.

In the past, such mirrored memory systems have used sequential updating of the memory units. That is, data is written first to one memory unit, then to the other memory unit, because such systems have been limited to communicating over a single bus. In some real-time processing systems, sequential updating is not fast enough to provide adequate response time to incoming commands and requests. Further, determining that two such sequentially updated memory units are in fact identical can be difficult and time consuming. Another difficulty posed by sequentially-updated memory units is "equalizing" a replacement unit in real-time from a surviving on-line unit without significant degradation in processing throughput.

Therefore, a need still exists for providing fast mirrored memory functionality in a multiprocessor design. The present invention provides a novel solution to this problem.

SUMMARY OF THE INVENTION

The present invention comprises a multi-processor system having mirrored memory units accessible by either processor. The term "mirrored memory" in the context of the present invention describes the ability of each of the processors to directly READ and WRITE the contents of its own local random access memory (RAM) unit and in the local RAM unit of the other, remote processor. The mirrored memory of the present invention comprises two processing units having triple-ported RAM, each unit interconnected by a pair of interprocessor busses to the other unit. "Triple-porting" describes the three input/output ports available for accessing a RAM unit. An internal port is used by a processor to access its local RAM, while the other two ports are provided so that the same RAM can be accessed by the remote processor through the paired interprocessor busses. Each processor may READ or WRITE its own local RAM, the remote processor's RAM, or both RAM's during a single operation.

The present mirrored memory design facilitates concurrent and independent execution of both processors of a pair. This form of concurrent execution is constrained only when both processors are attempting accesses involving the remote processor's RAM, when both processors are competing for a single interprocessor bus (due to failure of one of the two interprocessor busses), or when both processors attempt a simultaneous READ-MODIFY-WRITE process cycle. Concurrent execution of both processors during mirrored RAM accesses is possible because the interprocessor busses are configurable as virtual dedicated ports (one for each processor).

The invention also provides a method for equalizing the memory unit of a replacement processor by the surviving on-line processor with minimal degradation in processing performance.

The details of one embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE INVENTION

Throughout this description, the preferred embodiment and examples shown should be considered as exemplars, rather than limitations on the method of the present invention.

General Environment

Figure 1:
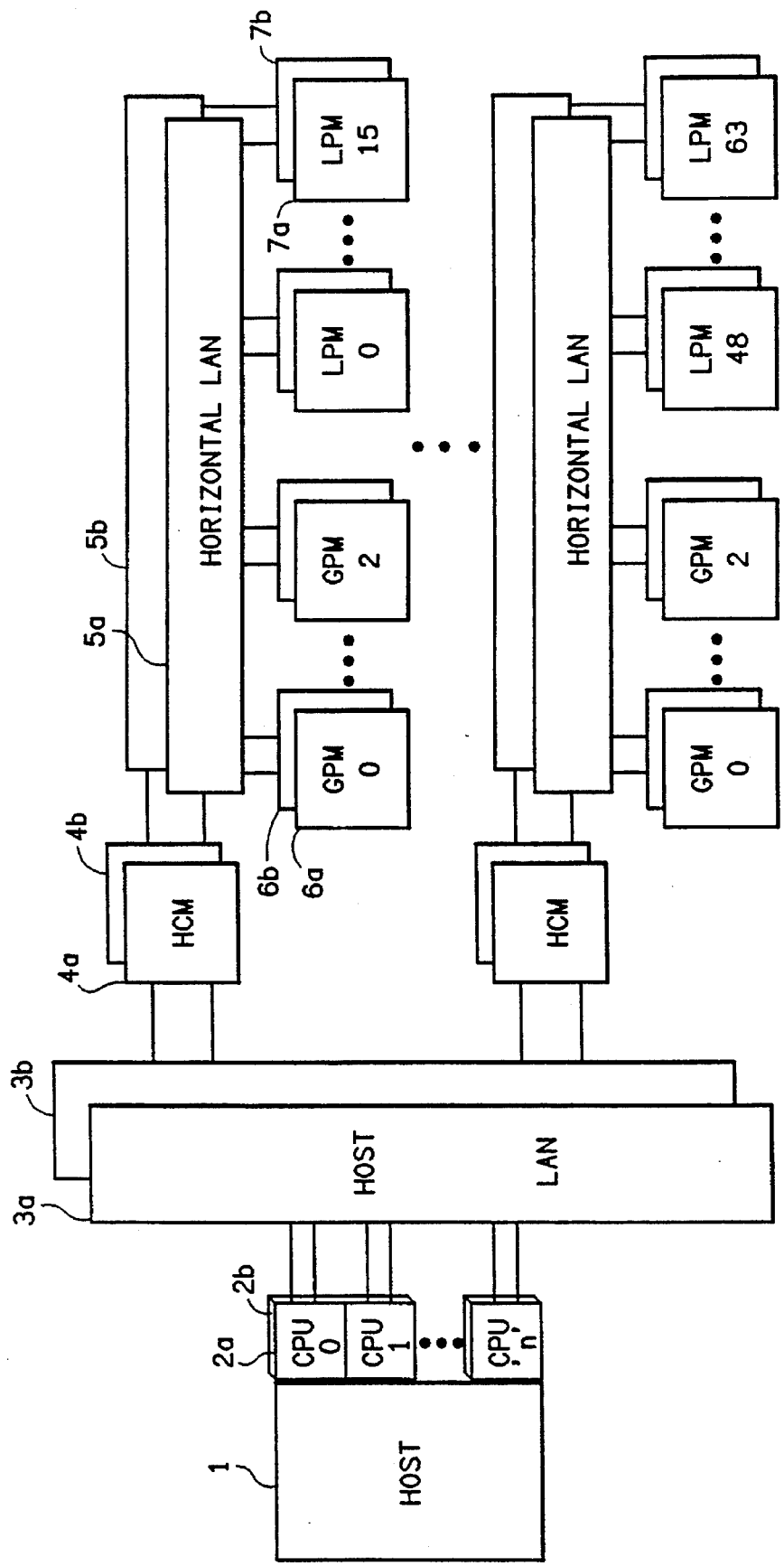
FIG. 1 is a block diagram showing a telecommunications computer processing system using the present invention.

For purposes of understanding the use of the present invention, FIG. 1 sets forth a block diagram of a highly-redundant telecommunications computer processing system using the present invention. Such a system typically would be used as a service control point in the intelligent communication network associated with a public access phone system to handle queries from a service switching point. A service switching point is an electronic switch, typically in a telephone company's central office, that is programmed to format and send queries to the intelligent network for routing and obtaining call-processing information. A service control point is a network node that provides an on-line database and call-processing information needed to respond to queries generated by a service switching point. An example of one of the services made possible by such a system is "800" number telephone billing verification.

In FIG. 1, a host computer 1 with multiple redundant processing unit pairs 2a, 2b is coupled to a pair of "host" local area networks (LAN's) 3a, 3b. The LAN's 3a, 3b couple the host computer 1 to multiple pairs of host communications processors 4a, 4b, which control the operation of corresponding pairs of "horizontal" LAN's 5a, 5b. The host and horizontal LAN's 3a, 3b, 5a, 5b may be any suitable LAN system, such as one based on the well-known Ethernet standard. The host communications processors 4a, 4b function principally as network controllers for the host and horizontal LAN's 3a, 3b, 5a, 5b. The horizontal LAN's 5a, 5b are coupled to two types of paired processing elements: general purpose modules (GPM's) 6a, 6b, and link processor modules (LPM's) 7a, 7b. In this particular system, the LPM's 7a, 7b are connected to the intelligent network associated with a public access phone system.

The LPM's 7a, 7b receive query packets over the intelligent network from service switching points, format such packets for transmission to the host computer 1, receive response packets from the host computer 1, and format the responses for transmission over the intelligent network to the corresponding service switching point.

The GPM's 6a, 6b are used to store critical routing and other network information that may be needed by the LPM's 7a, 7b. Although such information could in theory be stored in the host computer 1, time-critical response requirements of the intelligent network requires that certain information be available to the LPM's without the delay that may occur in transmitting requests and responses over both the host and horizontal LAN's 3a, 3b, 5a, 5b. The GPM's 6a, 6b can be used to store such information and process certain queries from the LPM's 7a, 7b to meet such time-critical needs.

As is clear from FIG. 1, the illustrated computer processing system is highly redundant, with every principal element duplicated. Thus, if any one element fails, the continued operation of its paired element allows processing to continue uninterrupted. The inventive multi-processor system is the basis for the GPM 6a, 6b units shown in FIG. 1. In order to provide a robust and fault-tolerant system, the GPM's 6a, 6b are not only provided in mirrored pairs, but they share mirrored memory units. Thus, all data necessary for operation of the system at the GPM level is stored redundently in the mirrored memory units. A pair of GPM's 6a, 6b must therefore update each of their memory units whenever a WRITE cycle occurs that affects data to be held in common during normal operation. The present invention permits such updating to occur concurrently rather than sequentially.

Structure of the Invention

Figure 2:
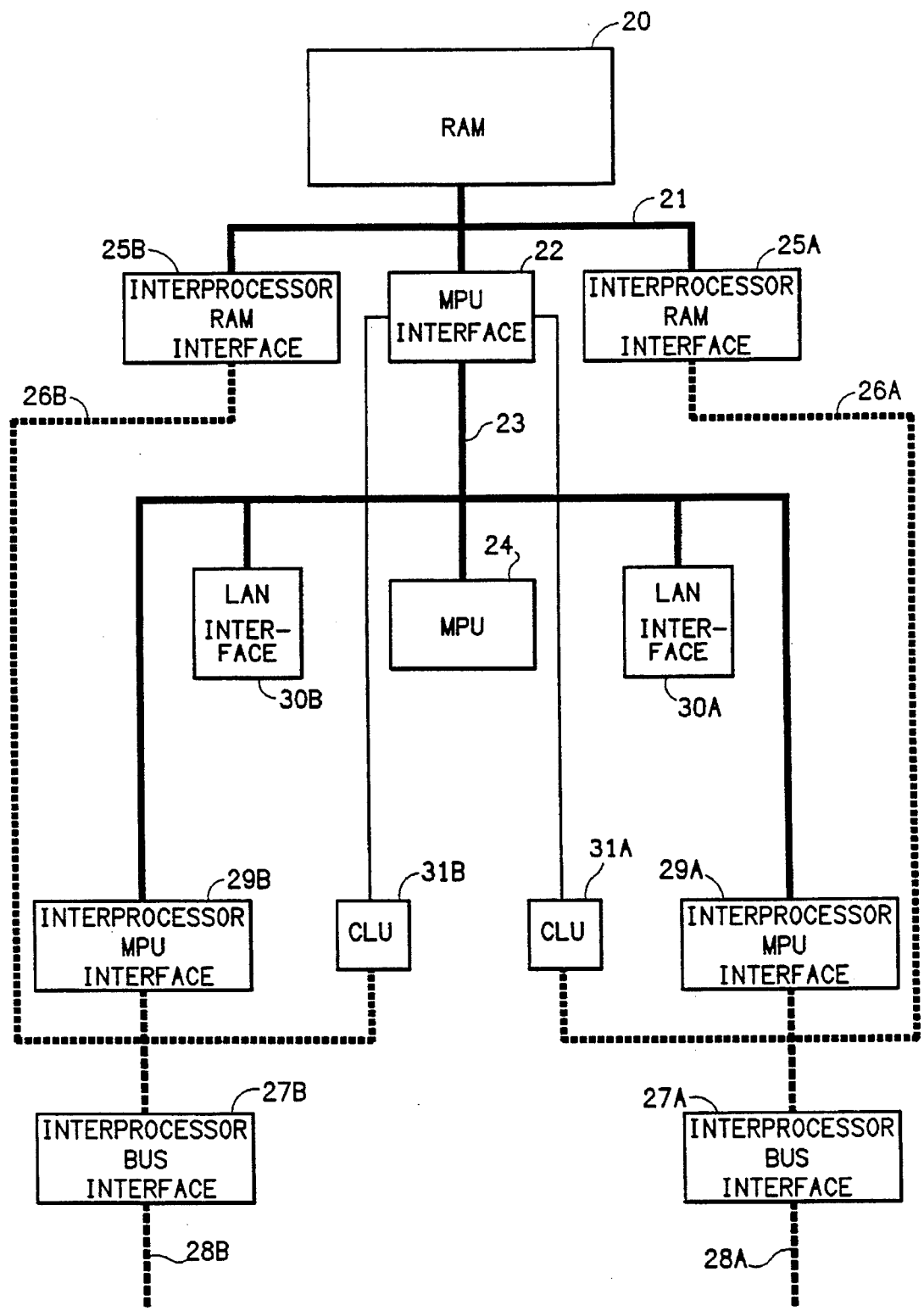
FIG. 2 is a block diagram of one-half of a dual processor system with a mirrored memory architecture in accordance with the present invention.

FIG. 2 is a block diagram of one-half (e.g., the "A" half of an A-B pair) of a dual processor system with a mirrored memory architecture in accordance with the present invention. The circuit shown would comprise the basis for one general purpose module (e.g., unit 6a in FIG. 1). A duplicate "mirrored" processor (e.g., the "B" half of an A-B pair) would comprise the basis for a paired general purpose module (e.g., unit 6b in FIG. 1).

The inventive circuit comprises a "local" RAM unit 20 coupled through a RAM bus 21 to a RAM-microprocessor unit (MPU) bus interface 22, which in turn is coupled to an MPU bus 23. The RAM-MPU bus interface 22 is essentially a switch or multiplexor, permitting address, data, and control signals to be selectively coupled between the RAM bus 21 and the MPU bus 23.

The RAM-MPU bus interface 22 is coupled through the MPU bus 23 to a microprocessor unit (MPU) 24. In the preferred embodiment, MPU 24 comprises a microprocessor and a memory management unit (MMU). These components may be, for example, a Motorola Corporation 68020 microprocessor and 68851 memory management unit.

"Local" with respect to the RAM unit 20 is relative to the MPU 24 shown in FIG. 2. In the mirrored "B" processor that would be paired with the "A" processor shown in FIG. 2, a like RAM unit 20' (not shown) would be the "remote" memory unit with respect to the MPU 24 shown in FIG. 2. Similarly, the RAM unit 20 shown in FIG. 2 would be the "remote" memory unit with respect to the MPU 24' (not shown) of the "B" processor paired with the "A" processor shown in FIG. 2.

The RAM unit 20 is also coupled through the RAM bus 21 to a pair of interprocessor bus-RAM bus interfaces 25A, 25B, which in turn are coupled to corresponding internal interprocessor busses 26A, 26B. The interprocessor bus-RAM bus interfaces 25A, 25B are essentially switches or multiplexors, permitting address, data, and control signals to be selectively coupled between the RAM bus 21 and the corresponding internal interprocessor busses 26A, 26B. The interprocessor bus-RAM bus interfaces 25A, 25B are coupled through the corresponding internal interprocessor busses 26A, 26B to corresponding external interprocessor interfaces 27A, 27B, which are in turn coupled to corresponding external interprocessor busses 28A, 28B. The external interprocessor busses 28A, 28B couple the entire "A" processor shown in FIG. 2 to a mirrored "B" processor (not shown) of like configuration. The external interprocessor interfaces 27A, 27B essentially comprise transceiver, buffer, and parity circuits for transmitting and receiving address, data, and control signals between the "A" processor shown and the corresponding external interprocessor interfaces 27A, 27B of the mirrored "B" processor (not shown).

The external interprocessor interfaces 27A, 27B are also coupled to corresponding internal interprocessor bus-MPU bus interfaces 29A, 29B, which are in turn coupled to the MPU bus 23. The interprocessor bus-MPU bus interfaces 29A, 29B are essentially switches or multiplexors, permitting address, data, and control signals to be selectively coupled between the external interprocessor interfaces 27A, 27B and the MPU bus 23.

Also coupled to the MPU bus 23 are a pair of local area network (LAN) interfaces 30A, 30B, which provide for inter-module communications between the processor (GPM) shown in FIG. 2 and a link processor module (LPM) over one of the horizontal LAN's 5a, 5b shown in FIG. 1.

The last elements shown in FIG. 2 are a pair of compare logic units (CLU) 31A, 31B which are coupled to respective ones of the internal interprocessor busses 26A, 26B, and to the RAM-MPU bus interface 22. The CLU's 31A, 31B are essentially simple comparators that compare incoming data from a remote mirrored RAM unit 20' (via the external interprocessor busses 28A, 28B) to corresponding data from the local mirrored RAM 20 unit (monitored via the RAM-MPU bus interface 22). The CLU's 31A, 31B generate an "interprocessor bus data miscompare fault" if such corresponding data values do not match. Interprocessor bus data miscompare faults occur when a data value read from the remote mirrored RAM unit 20' on the "current" interprocessor bus (i.e., either interprocessor bus 28A or 28B) differs from the corresponding data value in local mirrored RAM unit 20. These faults occur only when the local MPU 24 is performing a paired READ from the mirrored RAM units 20, 20'. Such faults may occur because of local or remote hardware interprocessor bus failures, and actual differences in data values in the mirrored RAM units. Mirrored RAM discrepancies are most likely caused by software anomalies and may occur as a result of a simultaneous WRITE operation from paired MPU's 24, 24'. Recovery from interprocessor bus data miscompare errors is effected by switching to the redundant interprocessor bus, and rerunning the faulted memory access cycle. If switching the interprocessor bus still produces an interprocessor bus data miscompare error, then a discrepancy in the mirrored RAM contents is assumed, and an error message is sent to the controlling monitor programs in the processors for error handling.

The architecture depicted in FIG. 2 shows that the RAM unit 20 of each processor is triple-ported, and that each RAM unit 20 is interconnected by a pair of external interprocessor busses 28A, 28B to the corresponding triple-ported RAM of the remote processor. The mirrored memory provided by coupling "A" and "B" processors of the type shown in FIG. 2 permits each of the dual MPU's 24, 24' to directly READ from and WRITE to its own local RAM unit and the local RAM unit of the remote processor. Further, the inventive architecture permits each MPU 24, 24' to READ or WRITE its own local RAM, the remote processor's RAM, or both RAM's during a single operation, simply by enabling the appropriate combination of interfaces. In normal operation, both interprocessor busses 28A, 28B are used, with the pair of processors being able to continue operation if either interprocessor bus fails.

The present mirrored memory design facilitates concurrent and independent execution of both microprocessors of a pair. This form of concurrent execution is constrained only when both MPU's are attempting memory accesses involving the remote MPU's RAM unit, when both MPU's are competing for a single interprocessor bus (due to failure of one of the two interprocessor busses), or when both MPU's attempt a simultaneous READ-MODIFY-WRITE memory access cycle. Concurrent execution of both MPU's during mirrored RAM accesses is possible because the interprocessor busses are configurable as virtual dedicated ports (one for each processor). This permits full duplex operation of the processors across the dual interprocessor busses 28A, 28B.

The present invention uses a common memory-mapped input/output access approach for mirrored memory, whereby the mirrored memory RAM units are effectively wired to memory locations and are therefore accessible via memory READS and memory WRITES. The hardware design described above provides physical memory-mapped addresses for this resource. Software, with the help of the memory management unit (MMU), provides logical addresses for the mirrored memory.

The present invention provides three distinct physical addressing ranges for the mirrored memory resource. These ranges provide unique addressing for (1) local RAM unit access, (2) remote RAM unit access (i.e., access to the paired MPU's RAM unit), and (3) dual RAM unit access (i.e., simultaneous access to both local RAM and remote RAM units). In the preferred embodiment, the physical address ranges, unlike the logical address ranges, are fixed and cannot be altered. Furthermore, the physical address ranges are not valid after the MMU is enabled, except within the mapping descriptors maintained by the MMU. Physical addressing accommodates memory expansion up the 32 megabytes in the preferred embodiment. Implementation of such memory mapping is well-known in the art.

Operation

In the preferred embodiment of the present invention, the RAM units 20, 20' of each MPU 24 is not used exclusively for data storage area. The RAM may also be used for code execution—the particular function of the RAM is entirely a matter of configuration and convention. In other words, despite the ability of the hardware system to mirror the entire local RAM unit 20, 20' address range, in practice only a subset is configured as allocatable mirrored memory. Software running on the MPU's 24, 24' uses a memory model that divides the local RAM 20, 20' of each MPU 24, 24' into program area (which is not shared or mirrored with the paired MPU), a system memory area (a pool of allocatable local RAM that is private to the local MPU), and allocatable mirrored memory area which is maintained as an "equalized" data area (i.e, modifications made in one mirrored memory area are "reflected" in the paired MPU's mirrored memory area so that the two mirrored memory areas are kept "equal" in content).

The function of the allocatable mirrored memory area is to provide a means to maintain data integrity for software applications despite the occurrence of single-point failures in a dual processor system. Use of the mirrored memory area implies data redundancy. Thus, all mirrored memory data objects literally co-exist in both processors comprising a GPM pair (assuming both processors are operational and in duplex mode). Therefore, the invention provides that both MPU's 24, 24' of a pair of processor units share mirrored memory areas in the RAM units 20, 20' in the most literal sense, and co-exist with complete parity with respect to their right to allocate and access both "local" memory and "remote" memory. However, as with any pool of allocatable memory, concurrent access contention (either intraprocessor or interprocessor) requires that memory allocations be coordinated with a locking mechanism. In the present invention, access contention is resolved on a first-come, first-serve basis, in known fashion. Each MPU locks the entire memory area that it accesses during a WRITE operation. MPU's have the right to allocate mirrored memory as they choose, so long as the allocation action yields to prior resource locks on the mirrored memory.

Remote RAM block occurs when both MPU's 24, 24' of a pair of processors attempt a simultaneous lock instruction on paired mirrored RAM units 20, 20'. Each MPU is able to read the target address in its local RAM unit but cannot read the remote RAM unit address. An associated bus error exception occurs in both processors of a pair. Generally, these faults are caused by software lock collisions, but can also be the result of hardware failures. Recovery from remote RAM lock faults is accomplished by biasing one MPU 24 such that it delays re-running a faulted access cycle momentarily while the other MPU 24' reruns its faulted access cycle. This eliminates synchronized lock contention, which might occur if both MPU's 24, 24' attempted identical recovery procedures.

The mirrored memory capability of the present invention is enhanced by a "mirrored memory equalization" procedure. Mirrored memory equalization encompasses all aspects of establishing coherency (i.e., mirrored data contents) between the paired RAM units of two MPU's in the present invention. Equalization is necessary when an "out-of-service" processor of a pair is being placed "in service" (i.e., a replacement processor is being installed and prepared for use). The inventive design accommodates the interprocessor mirrored memory equalization process in a much less intrusive manner than would be typically employed. Most of the equalization process is performed by the out-of-service processor, thereby minimizing run-time impacts on the in-service processor. Mirrored memory equalization includes the following major functions: mirrored RAM biasing; mirrored RAM equalization; and mirrored memory object mapping equalization.

"Mirrored RAM biasing" is effectively a first pass, pre-equalization operation which establishes only approximate identity between the contents of a pair of mirrored RAM's 20, 20'. This phase is performed to reduce run-time bus errors in the in-service processor during the actual mirrored RAM equalization. (Such bus errors would be due to the fact that the in-service processor is switched to duplex mode, in which WRITES are directed to both the local RAM unit and the remote RAM unit, during the actual mirrored RAM equalization procedure so that any run-time WRITES to mirrored memory are copied to both mirrored RAM units 20, 20'. In the illustrated embodiment, duplex mode applies to both WRITES and READS, so READS performed during equalization would almost always cause data miscompare bus errors if the out-of-service processor's mirrored RAM is not first "biased", because the contents of the RAM units 20, 20' would only rarely match).

Therefore, the in-service processor is placed in non-duplex mode (i.e., it cannot access the RAM unit of the out-of-service processor), and a program in the out-of-service MPU copies the contents of the in-service MPU's mirrored RAM area to the contents of the out-of-service MPU's mirrored RAM area, using standard direct memory access (DMA) techniques. This action is performed without regard for the current READ or WRITE activities of the in-service MPU. This biasing essentially makes the out-of-service processor's mirrored RAM area approximate the contents of the in-service processor's mirrored RAM area. However, since the in-service processor continues normal operation during the biasing phase, WRITES to its local RAM 20 in addresses that have already been copied to the out-of-service processor's mirrored RAM will generally cause the mirrored memory areas to be non-identical in content after the RAM biasing operation.

Mirrored RAM equalization is the act of establishing data coherency in the mirrored RAM areas of the paired processors. This equalization phase is the "true" mirrored RAM equalization procedure. Mirrored RAM equalization is performed by a program residing in the out-of-service processor. At the start of the equalization process, the in-service processor is informed (i.e., a signal is sent via an interprocessor bus interrupt from the out-of-service processor) that RAM equalization has begun. This causes the in-service processor to switch to duplex mode. Thus, all subsequent WRITES from the in-service processor update both processors' mirrored RAM areas. The mirrored RAM equalization procedure copies the contents of the in-service processor's mirrored RAM area to the contents of the out-of-service processor's mirrored RAM area, preferably a "long word" (i.e., 4 bytes) at a time. After each long word is copied, the contents of the remote and local long word are compared. If the contents are equal, the next long word location is copied and compared until both of the mirrored RAM units are equalized. If the contents of the remote and local long word differ, then the copy and compare operation is re-executed several times until the operation either succeeds or fails. This approach assumes that the RAM unit contents differ because of a simultaneous WRITE by both processors to the same location.

Since the equalization routine executes in the out-of-service processor, tasks running in the in-service processor execute normally. Mirrored memory updates required by normal tasks on the in-service processor are written in a dual fashion to both RAM units 20, 20' concurrently with the execution of equalization routine in the out-of-service processor. This eliminates sequence-oriented considerations during the equalization process (i.e., updates required for addresses being written "behind" the current equalization address pointer to memory are performed automatically and transparently during normal task accesses), Mirrored memory mapping equalization is the act of establishing memory map coherency for the mirrored memory objects of two paired processors, and is performed after mirrored RAM units have been equalized. Equalization of the mirrored memory mapping data (i.e., common addressing of mirrored memory objects) must be established for all run-time mapped mirror memory objects when the second processor of a pair is being placed in-service. The object mapping equalization procedure is performed by the out-of-service processor so the run-time impacts on the in-service processor are inconsequential.

Mapping equalization of companion overlay frames is performed by a routine in the out-of-service processor that scans the in-service processor segment attribute tables (SAT's) for mirrored memory objects. The out-of-service processor chooses an overlay frame pair (map) to equalize—by indexing through all of the in-service processor's overlay frame pairs. Each segment entry in the in-service processors associated SAT is scanned, looking for mirrored memory objects. As mirrored objects are encountered, the out-of-service processor copies the mapping data from the in-service processor's overlay frame to the out-of-service processor's local overlay frame, and also copies the SAT entry in the same fashion. The equalization procedure then resumes scanning the SAT for subsequent mirrored memory objects to equalize. This process continues until all companion overlay frames have been equalized.

Thus, the dual-bus structure of the preferred embodiment, along with the triple-ported memory, provides dynamic routing capabilities, operational redundancy, and real-time equalization. A system made in accordance with the teachings of the present invention may thus be preferentially used where speed of access and redundancy of function is required.

A number of embodiments of the present invention have been described. Nevertheless, it will be understood that various modifications may be made without departing from the spirit and scope of the invention. For example, the concepts of the present invention could be extended to more than two processors, for even greater redundancy. Further, although particular couplings of the components are shown, other arrangements and couplings would be well within the scope of one of ordinary skill in the art. Accordingly, it is to be understood that the invention is not to be limited by the specific illustrated embodiment, but only by the scope of the appended claims.

What is claimed is:

1. A multiprocessor, shared memory system comprising at least two processors, each processor having:

(a) at least two external communications paths;

(b) a memory unit having at least three ports;

(c) a processor and memory management unit coupled to the memory unit through a first port;

(d) first coupling means for independently and directly coupling at least the other two ports of the memory unit to at least two of the external communications paths of another processor;

(e) second coupling means independently and directly coupling the processor and memory management unit to at least two of the external communications paths of another processor;

the first coupling means controlling data accesses to the memory unit by at least one other processor, and the second coupling means controlling data accesses by the processor and memory management unit to the memory unit of at least one other processor, whereby each processor is normally active and may, in a single operation, independently access only its memory, only the memory of at least one other processor, or both its memory and the memory of at least the other processor.

2. The invention of claim 1, further including data comparison means, coupled to receive at least the data values from the memory unit of the processor and from the corresponding memory of at least one other processor, for comparing data values accessed by the processor and memory management unit from the memory unit of the processor and from the corresponding memory of at least one other processor, and signaling an error condition if the accessed data values are not equivalent.

3. The invention of claim 2, wherein selected data generated by each processor and memory management unit of a processor is stored in a selected area of the memory unit of another processor, such that the selected data is mirrored in at least two processors.

4. The invention of claim 1, further including a duplex mode of operation, wherein the processor and memory management unit of a processor accesses the memory unit of another processor over a first external communications path, and the memory unit of the processor is accessed by the other processor over a second external communications path.

5. The invention of claim 4, wherein each of the processors can continue to access the memory unit of the other processor over one of the external communications paths if the other communications path is inoperative.

6. A multiprocessor, shared memory system comprising at least two processors, each processor having:

(a) a memory unit having at least three ports;

(b) a processor and memory management unit coupled to the memory unit through a first port;

(c) at least first and second internal interprocessor interfaces, each coupled to the processor and memory management unit, and directly to respective second and third ports of the memory unit;

(d) at least first and second external interprocessor interfaces, each coupled to a respective one of the at least first and second internal interprocessor interfaces, to the respective second and third ports of the memory unit, and to a corresponding external interprocessor interface of at least one other processor;

the external and internal interprocessor interfaces controlling data accesses to the memory unit by at least one other processor, and controlling data accesses by the processor and memory management unit to the memory unit of at least one other processor, whereby each processor is normally active and may, in a single operation, independently access only its memory unit, only the memory unit of at least one other processor, or both its memory unit and the memory unit of at least one other processor.

7. The invention of claim 6, further including data comparison means, coupled to receive at least the data values from the memory unit of the processor and from the corresponding memory of at least one other processor, for comparing data values accessed by the processor and memory management unit from the memory unit of the processor and from the corresponding memory of at least one other processor, and signaling an error condition if the accessed data values are not equivalent.

8. The invention of claim 7, wherein selected data generated by each processor and memory management unit of a processor is stored in a selected area of the memory unit of another processor, such that the selected data is mirrored in at least two processors.

9. The invention of claim 6, further including a duplex mode of operation, wherein the processor and memory management unit of a processor accesses the memory unit of another processor through one coupled set of the first and second external interprocessor interfaces, and the memory unit of the processor is accessed by the other processor through the second coupled set of the first and second external interprocessor interfaces.

10. The invention of claim 9, wherein each of the processors can continue to access the memory unit of the other processor through one coupled set of the first and second external interprocessor interfaces if the other coupled set of the first and second external interprocessor interfaces is inoperative.

11. A multiprocessor, shared memory system comprising paired processors, each processor having:

(a) a memory bus;

(b) a memory unit coupled to the memory bus;

(c) a processor bus;

(d) a processor and memory management unit coupled to the processor bus;

(e) a memory-processor interface coupled to the memory bus and the processor bus, for controlling transfers of data between the memory unit and the processor and memory management unit;

(f) first and second external interprocessor interfaces each coupled to respective first and second internal interprocessor busses and to respective first and second external interprocessor busses, the first and second external interprocessor busses directly coupling each processor to the corresponding first and second external interprocessor busses of its paired processor, the first and second external interprocessor bus interfaces for controlling information transfers between the respective first and second external interprocessor busses and the respective first and second internal interprocessor busses;

(g) first and second internal interprocessor interfaces, each respectively coupled to the first and second internal interprocessor busses and to the processor bus, for controlling information transfers between the respective first and second internal interprocessor busses and the processor bus;

(h) first and second interprocessor-memory bus interfaces each respectively coupled to the first and second internal interprocessor busses and to the memory bus for controlling information transfers between the respective first and second internal interprocessor busses and the memory bus; and (i) data comparison means coupled to receive data from the memory unit of the processor and from the corresponding memory of its paired processor, for comparing the data accessed by the processor and memory management unit from the memory unit of the processor and from the corresponding memory of its paired processor, and signaling an error condition if the data accessed from the paired processors are not equivalent;

whereby each processor is normally active and may, in a single operation, independently access only its memory unit, only the memory unit of its paired processor, or both its memory unit and the memory unit of its paired processor.

12. A method for equalizing the data contents of the memory units of a multiprocessor, shared memory system comprising at least two processors, each processor having at least two external communications paths, a memory unit having at least three ports, a processor and memory management unit coupled to the memory unit through a first port, first coupling means for independently coupling at least two ports of the memory unit to at least two of the external communications paths of another processor, second coupling means for independently coupling the processor and memory management unit to at least two of the external communications paths of another processor, data comparison means, coupled to receive at least the data values from the memory unit of the processor and from the corresponding memory of at least one other processor, for comparing data values accessed by the processor and memory management unit from the memory unit of the processor and from the corresponding memory of at least one other processor, the method comprising the steps of:

(a) operating one processor in an out-of-service mode, whereby the out-of-service processor is enabled to access the memory unit of a second processor;

(b) operating the second processor in an in-service non-duplex mode, whereby the in-service processor is disabled from accessing the memory unit of the out-of-service processor but operates to execute at least one operational task;

(c) copying selected data from the memory unit of the in-service processor into the memory unit of the out-of-service processor over one of the communications paths, concurrent with the execution of at least one operational task in the in-service processor;

(d) after all selected data is copied, switching the in-service processor to a duplex mode, whereby the in-service processor is enabled to access the memory unit of the out-of-service processor while operating to execute at least one operational task;

(e) re-copying a portion of the selected data from the memory unit of the in-service processor into the memory unit of the out-of-service processor over one of the communications paths, concurrent with the execution of at least one operational task in the in-service processor;

(f) comparing the re-copied portion of data in the memory unit of the in-service processor with the corresponding portion of the previously copied data from the memory unit of the in-service processor, and indicating an error if the compared data is not equivalent;

(g) writing data changed by the execution in the in-service processor of at least one operational task to the memory unit of the out-of-service processor;

(h) repeating steps (e) through (g) until all of the selected data is re-copied into the memory unit of the out-of-service processor;

(i) thereafter, operating the out-of-service processor in an in-service mode.

13. A method for equalizing the data contents of the memory units of a multiprocessor, shared memory system comprising at least two processors, each processor having at least two external communications paths, a memory unit having at least three ports, a processor and memory management unit coupled to the memory unit through a first port, first coupling means for independently coupling at least two ports of the memory unit to at least two of the external communications paths of another processor, second coupling means for independently coupling the processor and memory management unit to at least two of the external communications paths of another processor, the first coupling means controlling data accesses to the memory unit by at least one other processor, and the second coupling means controlling data accesses by the processor and memory management unit to the memory unit of at least one other processor, data comparison means, coupled to receive at least the data values from the memory unit of the processor and from the corresponding memory of at least one other processor, for comparing data values accessed by the processor and memory management unit from the memory unit of the processor and from the corresponding memory of at least one other processor, and signaling an error condition if the accessed data values are not equivalent, whereby each processor may independently access only its memory, only the memory of at least one other processor, or both its memory and the memory of at least one other processor, the method comprising the steps of:

(a) operating one processor in an out-of-service mode, whereby the out-of-service processor is enabled to access the memory unit of a second processor;

(b) operating the second processor in an in-service non-duplex mode, whereby the in-service processor is disabled from accessing the memory unit of the out-of-service processor but operates to execute at least one operational task;

(c) copying selected data from the memory unit of the in-service processor into the memory unit of the out-of-service processor over one of the communications paths, concurrent with the execution of at least one operational task in the in-service processor;

(d) after all selected data is copied, switching the in-service processor to a duplex mode, whereby the in-service processor is enabled to access the memory unit of the out-of-service processor while operating to execute at least one operational task;

(e) re-copying a portion of the selected data from the memory unit of the in-service processor into the memory unit of the out-of-service processor over one of the communications paths, concurrent with the execution of at least one operational task in the in-service processor;

(f) comparing the re-copied portion of data in the memory unit of the in-service processor with the corresponding portion of the previously copied data from the memory unit of the in-service processor, and indicating an error if the compared data is not equivalent;

(g) writing data changed by the execution in the in-service processor of at least one operational task to the memory unit of the out-of-service processor;

(h) repeating steps (e) through (g) until all of the selected data is re-copied into the memory unit of the out-of-service processor;

(i) thereafter, operating the out-of-service processor in an in-service mode.

14. A multiprocessor shared memory system comprising two processors, each of the two processors having:

an associated memory including first, second, and third ports;

a processing unit coupled for access to the associated memory through the second of the three ports, the processing unit independently accessing its associated memory through the second port thereof; and coupling means for redundantly and directly coupling the processing unit to the memory associated with the processing unit of the other of the two processors through the first and third ports of the memory of the other processing unit, the processing unit at the same time capable of accessing the memory associated with the processing unit through the second port and of accessing the memory associated with the other processing unit through the first and third ports of the memory of the other processing unit.

15. The system of claim 14, further including data comparison means coupled to the system for receiving data from the memories associated with each processing unit and for comparing the data and generating an error condition if the data accessed from the memories are not equivalent.

16. The system of claim 15, wherein the multiprocessor shared memory system functions in a duplex mode of operation, wherein the coupling means includes redundant access paths between each processing unit and the first and third ports of the memory associated with the other processing unit and, further, wherein one of the processing units of the two processors accesses the memory of the other processor over a first of the redundant access paths and the other of the processing units accesses the associated memory of the one processing unit over a second of the redundant access paths.

17. The system of claim 16, wherein each of the processing units can continue to access the memory of the other processor over one of the first and second path if the other of the first and second paths is inoperative.

* * * * *